(12) United States Patent
Naismith et al.

(10) Patent No.: US 10,606,124 B2
(45) Date of Patent: Mar. 31, 2020

(54) RECYCLING BACKLIGHT INCLUDING STRUCTURED REFLECTOR

(71) Applicant: 3M INNOVATIVE PROPERTIES COMPANY, St. Paul, MN (US)

(72) Inventors: Nathaniel K. Naismith, Woodbury, MN (US); Stephen J. Etzkorn, Woodbury, MN (US); David A. Rosen, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/308,248

(22) PCT Filed: Jun. 7, 2017

(86) PCT No.: PCT/US2017/036379
§ 371 (c)(1),
(2) Date: Dec. 7, 2018

(87) PCT Pub. No.: WO2017/214287
PCT Pub. Date: Dec. 14, 2017

(65) Prior Publication Data
US 2019/0265547 A1  Aug. 29, 2019

Related U.S. Application Data

(60) Provisional application No. 62/348,229, filed on Jun. 10, 2016.

(51) Int. Cl.
*G02F 1/1335* (2006.01)
*F21V 8/00* (2006.01)

(52) U.S. Cl.
CPC ..... *G02F 1/133605* (2013.01); *G02B 6/0055* (2013.01); *G02B 6/0056* (2013.01); *G02F 1/133536* (2013.01)

(58) Field of Classification Search
CPC .. G02B 6/0055; G02B 6/0056; G02B 6/0033; G02F 1/133536; G02F 1/133605
See application file for complete search history.

(56) References Cited

U.S. PATENT DOCUMENTS

| 8,434,909 B2 * | 5/2013 | Nichol | G02B 6/0018 |
| | | | 362/296.01 |
| 8,641,215 B2 * | 2/2014 | Tung | G09F 13/18 |
| | | | 362/610 |
| 2011/0037927 A1 | 2/2011 | Hara | |

(Continued)

FOREIGN PATENT DOCUMENTS

| JP | 2010-003510 | 6/2008 |
| WO | WO 2014-117086 | 7/2014 |

OTHER PUBLICATIONS

International Search report for PCT International Application No. PCT/US2017/036379 dated Aug. 18, 2017, 6 pages.

*Primary Examiner* — Peggy A Neils
(74) *Attorney, Agent, or Firm* — 3M Innovative Properties Company; Michael J. Stern (57) ABSTRACT

Recycling backlights are described. More specifically, recycling backlights including structured reflectors are described. The structured reflector redirects light at least for angles emitted from a lightguide and retroreflects other light, the retroreflected light having incidence angles not emitted by the lightguide.

25 Claims, 5 Drawing Sheets

(56) References Cited

U.S. PATENT DOCUMENTS

2012/0026431 A1     2/2012  Coggio
2016/0091750 A1     3/2016  Lien
2016/0266302 A1*    9/2016  Seen .................... G02F 1/1323

* cited by examiner

RECYCLING BACKLIGHT INCLUDING STRUCTURED REFLECTOR

BACKGROUND

Backlights provide substantially uniform illumination for a light-gating type display, such as a liquid crystal display. Displays such as liquid crystal displays that rely on polarization manipulation to form images may use efficient light recycling cavities in order to convert light of an unusable polarization (e.g. light that would be otherwise absorbed by the liquid crystal module) into light of a usable polarization. Structured reflectors use a shaped reflector in order to manipulate or redirect light.

SUMMARY

In one aspect, the present description relates to a recycling backlight system. The recycling backlight system includes a reflective polarizer, a structured reflector, and a lightguide having an input surface, the lightguide disposed between the reflective polarizer and the structured reflector. The lightguide has a first range of emission angles θ for light coupled into the input surface and extracted from the lightguide, the range of emission angles θ measured with respect to a normal axis of the reflective polarizer. The structured reflector is configured to retroreflect light at a second range of angles φ measured with respect to a normal axis of the reflective polarizer. The structured reflector is also configured to redirect light from a third range of angles ψ, measured with respect to the normal axis of the reflective polarizer, to within 30 degrees of the normal axis of the reflective polarizer. No angles of θ are also angles φ.

In another aspect, the present description relates to a recycling backlight system. The recycling backlight system includes a reflective polarizer, a structured reflector, and a lightguide having an input surface, the lightguide disposed between the reflective polarizer and the structured reflector. The lightguide has a first range of emission angles θ for light coupled into the input surface and extracted from the lightguide, the range of emission angles θ measured with respect to a normal axis of the reflective polarizer. The structured reflector is configured to reflect but not redirect light at a second range of angles φ measured with respect to the normal axis of the reflective polarizer. The structured reflector is also configured to redirect light from a third range of angles ψ, measured with respect to the normal axis of the reflective polarizer, to within 30 degrees of the normal axis of the reflective polarizer. No angles of θ are also angles φ.

DETAILED DESCRIPTION

Figure 1:
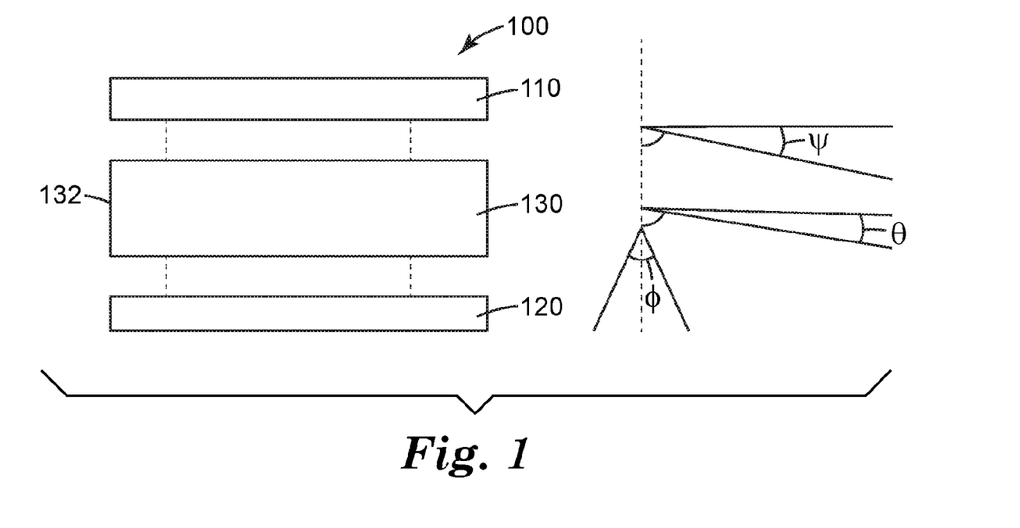
FIG. 1 is an exploded front elevation view of a recycling backlight including a structured reflector.

FIG. 1 is an exploded front elevation view of a recycling backlight including a structured reflector. Recycling backlight 100 includes reflective polarizer 110, structured reflector 120, and lightguide 130 having input surface 132.

Reflective polarizer 110 may be any suitable reflective polarizer. In some embodiments, the reflective polarizer may be a linear reflective polarizer. In some embodiments, the reflective polarizer may be a circular reflective polarizer. In some embodiments, the reflective polarizer may be a multilayer optical film. For example, the reflective polarizer may be or include a reflective polarizer laminate such as a DBEF reflective polarizer (available from 3M Company, St. Paul, Minn.). In some embodiments, the linear reflective polarizer may be an on-glass type reflective polarizer such as an APF reflective polarizer (available from 3M Company, St. Paul, Minn.)

Multilayer optical film reflective polarizers can be formed by any suitable combination of alternating birefringent materials, especially polymeric materials. In some embodiments, only one of the alternating layers may be birefringent. When oriented under carefully controlled process and material conditions, the layers form stacks of alternating high and low indexes of refraction along at least one of the orthogonal x, y, and z directions, where the x direction is the in-plane direction of greatest stretch. Reflective polarizers commonly have a closely matched (less than 0.05) index of refraction difference between the layers in one in-plane direction and a mismatched (greater than 0.05) index of refraction difference between the layers in the other in-plane direction. The optical thickness (index of refraction times the physical thickness) of each layer pair determines the center of the reflection band corresponding to that layer pair, and the index of refraction contrast (difference) between the two layers determines the relative strength of that reflection band. Various other details such as layer profile design, protective boundary layers, skin layers, or f-ratio of layer pairs may be modified as suitable for the desired application. The reflective polarizer may also have a dimensionally thick or stable layer to preserve or enhance physical characteristics such as warp resistance or stiffness.

Structured reflector 120 may be any suitable material and any suitable size and shape. Structured reflector 120 may be or include a multilayer optical film, such as an ESR reflector (available from 3M Company, St. Paul, Minn.). In some embodiments, structured reflector 120 is a reflective metal. In some embodiments, the reflector is a polymeric or other substrate that includes a reflective metalized surface. The specific structured surface of structured reflector 120 is described in more detail in FIGS. 2-5.

Lightguide 130 may be any suitable thickness and may have any suitable shape. In some embodiments, lightguide 130 may be substantially planar or film-shaped. In some embodiments, lightguide 130 may be wedge shaped. In some embodiments, lightguide 130 is formed from a transparent polymeric material through injection molding or any other suitable process. Lightguide 130 may include any number of extraction features, for example, either positive or negative microfeatures. In some embodiments, the extraction features may be printed or screen printed dots or other scattering features. In some embodiments, in order to provide more uniform light extraction by area, the extraction features may be arranged in a particular pattern or gradient.

Lightguide has at least one of input surface 132. Input surface 132 may include specific geometries or structured features to improve the coupling of light into lightguide 130. Input surface 132 may also include collimating optics.

Recycling backlight 100 may, in some embodiments, be laminated or bonded together to form a unitary body. In some embodiments, the components of recycling backlight 100 may be adhered or bonded with a pressure sensitive adhesive, with a curable (UV or heat curable) adhesive, through ultrasonic welding, heat bonding, with an optically clear adhesive, or with any suitable adhesive and through any suitable method. In some embodiments, the components of recycling backlight may be bonded together through a combination or variety of methods.

FIG. 1 also illustrates several ranges of angles that describe the configuration of recycling backlight 100. Each angle illustrated is measured with respect to the normal of the reflective polarizer, indicated as the dashed vertical line. The range of angles shown by θ are the angles emitted from the lightguide. In some embodiments, it may not be practical to consider the range of angles that encompasses every single angle light is extracted at. For example, manufacturing imprecisions, material impurities, or other nonuniformities may result in several stray rays. Therefore, it may be, in some embodiments, preferable to characterize the range of angles as the range that includes 90% of light extracted from the lightguide. In some embodiments, it may be preferable to characterize the range of angles as the range that includes of 95% of light extracted from the lightguide.

The structured reflector is configured such that it redirects light incident from the range of angles shown by ψ to within 30 degrees of the normal axis of reflective polarizer 110. In some embodiments, the structured reflector is configured such that it is designed to redirect light incidence from the range of angles shown by ψ to within 20 degrees of the normal axis of the reflective polarizer. The structured reflector is also configured such that it retroreflects light incident from the range of angles shown by ϕ. Retroreflection means that incident light is reflected in the direction from which it was incident (measured in the plane normal to the reflecting surface). In some embodiments, retroreflection within 1 degree of the direction from which it was incident is sufficient. In some embodiments, retroreflection within 5 degrees of the direction from which it was incident is sufficient. In some embodiments, no angles of θ are also angles of ϕ. In some embodiments, all angles of θ are also angles of ψ.

Figure 2:
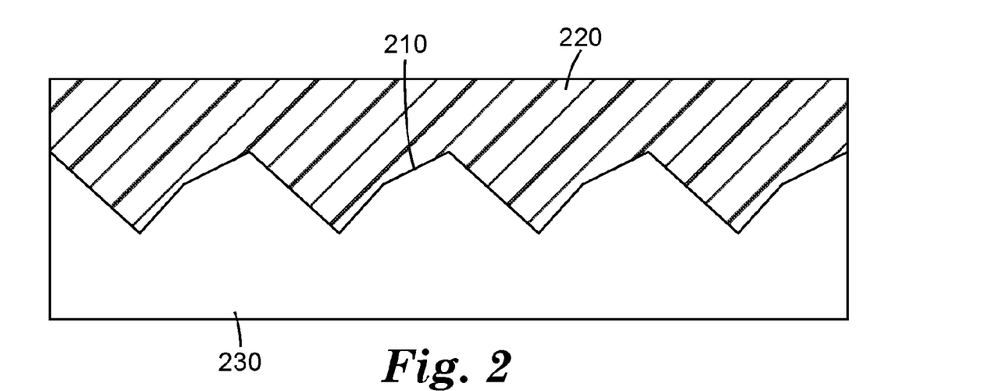
FIG. 2 is a front elevation cross section of an exemplary structured reflecting interface.
Figure 4:
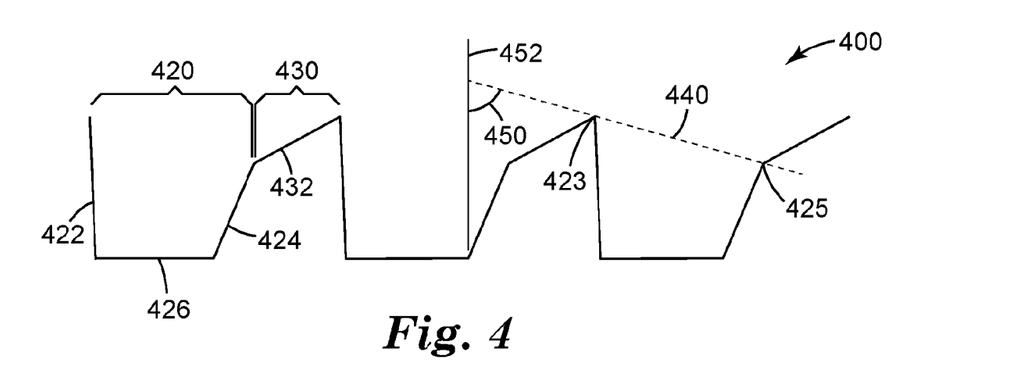
FIG. 4 is a front elevation cross section of another exemplary structured reflector.
Figure 5:
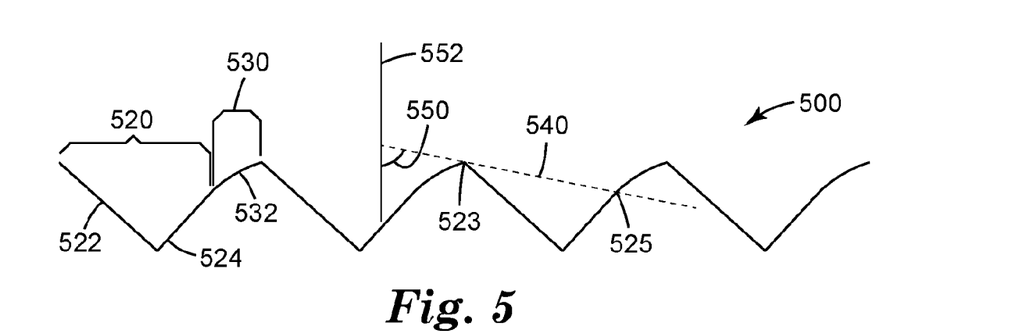
FIG. 5 is a front elevation cross section of another exemplary structured reflector.

FIG. 2 is a front elevation cross section of an exemplary structured reflecting interface. Structured reflector 200 includes reflecting interface 210 between first material 220 and second material 230. Reflecting interface 210, as the boundary between first material 220 and second material 230, illustrates the varieties of configurations available for a structured reflector. For example, in one configuration, first material 220 is a substantially transparent polymeric or glass material, such as acrylic, and second material 230 is air. In this case, light would be totally internally reflected at certain supercritical angles of incidence on reflecting interface 210. The structure may be made through any suitable process, including microreplication, embossing, or the like. In an alternative configuration, first material 220 is air and second material 230 is a polymeric material. In this case, reflecting interface 210 is a metalized reflective surface on second material 230. First and second materials may also be polymeric materials of different refractive indices, with reflecting interface 210 being a metallized reflective surface. The metallized reflective surface may be vapor deposited, electroplated, or be a metal thin film molded to the surface of one or both of the materials. With the context of FIG. 2 in mind, FIGS. 3-5 show merely the interface shape of the structured reflector in order to illustrate the flexibility in design for the structured reflector.

Figure 3:
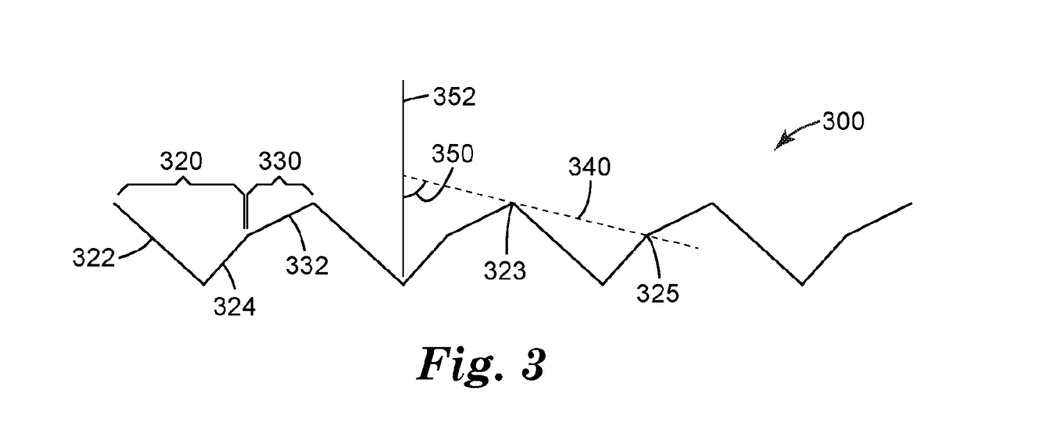
FIG. 3 is a front elevation cross section of an exemplary structured reflector.

FIG. 3 is a front elevation cross section of an exemplary structured reflector. Structured reflector 300 includes a plurality of microfeatures having right angle retroreflecting portion 320 and canted redirecting portion 330. Retroreflecting portion 320 includes facets 322 and 324, and corresponding base edges 323 and 325. Canted redirecting portion 330 includes facet 332. An angle between line 340 connecting base edges 323 and 325 and normal axis 352 is shown as 350.

Structured reflector 300 includes a plurality of microfeatures. Depending on the configuration of the structured reflector (i.e., whether the structured reflector reflects through total internal reflector or through a metallized reflective surface, the microfeatures can be either microcavities or microprisms.

Right angle retroreflecting portion 320 is formed from facets 322 and 324. Facet 322 is longer than 324; in other words, the facets of the right angle retroreflecting portion are asymmetric. Right angle retroreflecting portion 320 includes a right angle where the facets meet. In some embodiments, although the facets may still form a right angle, the retroreflecting portion may be tilted or canted from the normal of the reflective polarizer (shown in FIG. 3 as 352). In this case, the normal of the reflective polarizer intersecting the right angle of the right angle retroreflecting portion 320 will not result in two angles of equal values. Right angle retroreflecting portion 320 is responsible for the retroreflection of a range of incident angles on structured reflector 300. In other words, light incident on the right angle retroreflecting portion, within the range of retroreflected angles, is reflected, typically twice, such that it travels back from where it was incident.

Canted redirecting portion 330 is formed from facet 332. In some embodiments, facet 332 is flat. In some embodiments, facet 332 is slightly curved. Canted redirecting portion 330 redirects light incident on it from a certain range of angles to light that travels within a certain angle of the normal of the reflective polarizer. For example, light incident on canted redirecting portion 330 within the range of angles it redirects may be redirected to within 20 degrees of the normal of the reflective polarizer. In some embodiments, redirected light may be redirected within 30 degrees of the normal of the reflective polarizer. Both the angle of the canted redirected portion with respect to the normal and the shape of the facet may contribute to how broad or narrow of a light cone around the normal of the reflective polarizer incident light is redirected into. In some embodiments, canted redirecting portion 330 has a roughened or structured surface to broaden the light cone around the normal of the reflective polarizer incident light is redirected into.

In some embodiments, the proportion of the structured reflector's projected area occupied by a right angle retroreflecting portion is at least 40%. In some embodiments, it is at least 50%. In some embodiments, it is at least 60%. The particular balance between retroreflecting portions and redirecting portions likely depends on the desired application, taking into account the tradeoff between more of one and less of the other (and in some embodiments, a third type or fourth type, etc., of portion).

Another geometric feature of structured reflector 300 is that a line, 340, from the terminal edges of right angle retroreflecting portion 320, namely, edges 323 and 325, forms an angle with normal axis 352. In some embodiments, this angle, 350, is less than the smallest angle of θ, or the range of angles of light emitted from the lightguide. In this case, no light emitted from the lightguide will "see" the retroreflecting portion of the structured reflector, and so the design prevents light directly from the lightguide from being retrorefected.

FIG. 4 is a front elevation cross section of another exemplary structured reflector. Structured reflector 400 includes a plurality of microfeatures having reflecting portion 420 and redirecting portion 430. Reflecting portion 420 includes facets 422, 424, and 426 and base edges 423 and 425. Redirecting portion 430 includes facet 432. An angle between line 440 connecting base edges 423 and 425 and normal axis 452 is shown as 450.

Structured reflector 400 in FIG. 4 differs from structured reflector 300 in FIG. 3 at least because structured reflector 400 does not have any right angle retroreflecting portion. Instead, structured reflector 400 has reflecting portion 420 that reflects but does not redirect light. For purposes of this application, reflecting but not redirecting light means that the angle of incidence and angle of reflection are the same with respect to normal axis 452 (for clarity, this does not refer to the local surface normal, where this would be true for any reflective surface). The reflecting portions include a facet 426 generally flat and perpendicular to the normal axis. Because of constraints in manufacturing extremely steep side walls and dimensional stability of the structured reflector, facets 422 and 424 may not, in some embodiments, be parallel to normal axis 452 (i.e., perpendicular to facet 426).

Otherwise, structured reflector 400 is similar to structured reflector 300 in FIG. 3. A line 440 between the terminal edges 423, 425 of the reflecting portion makes an angle 450 with reference to the normal axis 452 of the reflective polarizer. By analogy to structured reflector 300 in FIG. 3, reflecting portions 420 may make up at least 40%, at least 50%, or at least 60% of the projected area of the structured reflector.

FIG. 5 is a front elevation cross section of another exemplary structured reflector. Structured reflector 500 includes a plurality of microfeatures having right angle retroreflecting portion 520 and canted curved redirecting portion 530. Retroreflecting portion 520 includes facets 522 and 524, and corresponding base edges 523 and 525. Canted curved redirecting portion 530 includes curved facet 532. An angle between line 540 connecting base edges 523 and 525 and normal axis 552 is shown as 550.

Structured reflector 500 in FIG. 5 is also similar to structured reflector 300 in FIG. 3, except that the redirecting portion is canted curved redirecting portion 530 including curved facet 532. Curved facet 532 may have any suitable radius of curvature. In some embodiments, one facet may (in the illustration of FIG. 5, facet 524) be an extension of the tangent of curved facet 532 at the point that it ends. In some embodiments, curved facet 532 may have simple curvature. In some embodiments, curved facet 532 may have complex curvature. In some embodiments, curved facet 532 may have discrete curved facets. Curved facet 532 may have convex or concave curvature. In some embodiments, as described above, the curvature of the curved facet may enable for a broader distribution of redirected light.

Again in FIG. 5, a line 540 between the terminal edges 523, 525 of the right angle retroreflecting portion makes an angle 550 with reference to the normal axis 552 of the reflective polarizer. By analogy to structured reflector 300 in FIG. 3 and structured reflector 400 in FIG. 4, right angle retroreflecting portions 520 may make up at least 40%, at least 50%, or at least 60% of the projected area of the structured reflector.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

EXAMPLES

Example 1

A computer model of a light guide stack was prepared as follows using LightTools software (available from Synopsis, Pasadena Calif.). The top layer of the stack was modeled as a reflective polarizer of refractive index 1.405 with 100% reflection in one axis and 100% transmission in the orthogonal axis. Immediately below it was a layer modeled as a perfect depolarizer with a 1.405 refractive index that converts polarized light into randomly polarized light. Below that was a layer modeled as a light guide having refractive index of 1.58. Its dimensions were 50 mm cross-guide by 198.25 mm down-guide. The upper surface of the light guide had prisms of refractive index 1.58 running down-guide and the bottom surface had extractors running cross-guide. The upper surface prisms had a pitch of 13 micrometers, included angles of 156.8 degrees and equal base angles. The bottom extractors had a depth of 1.18 microns, an extraction facet of 3.25 degrees facing the light input edge and a back facet angle of 20 degrees. The extractor density was constant with a down-guide spacing between extractors of 96.09 micrometers. The light guide was aligned so that the transmission axis of the reflective polarizer ran down-guide and transmitted 100% of the light in the cross-guide direction while reflecting 100% of the light polarized in the down-guide direction. It was also assumed that a material with refractive index 1.405 with no scattering and no absorption filled the space between the depolarizer and the light guide and thereby filled in the recesses of the structures on top of the light guide. A similar material was placed below the light guide's bottom extractors. The bottom layer of the light guide stack was a structured reflector with 95% surface reflectivity. Three such structured reflectors were modeled. The structured reflectors were modeled as prisms having surface reflectances of 94% that were oriented cross-guide, perpendicular to the direction of light propagation from the light source.

The light guide stack was modeled using each of three prism geometries. Each prism had a base having a length of 17 micrometers. One was a three-facet prism with the side facing the light source having two facets, a redirecting portion with an angle of 39 degrees relative to the base and base angles of 45 degrees. The facet nearest the base had a length of 6.90 micrometers and the other facet had a length of 5.15 micrometers. The distal side of the prism had length 11.48 micrometers. The second prism type was a canted prism with the side facing the light source having an angle with respect to the horizontal of 39 degrees, an included angle of 90 degrees and the other base angle 51 degrees. The third prism type had equal base angles of 39 degrees and an included angle of 102 degrees.

The light input to the light guide was modeled as a single discrete LED simulating a Nichia NSSW304D ray data source. The LED was placed at the center of the injection edge of the light guide. Before entering the light guide the rays were concentrated using a 100% reflecting air concentrator. After concentration the angle output of the source in air had a batwing shape with half angles of 80 degrees in the cross-guide direction and 32 degrees in the light guide thickness direction.

Figure 6:
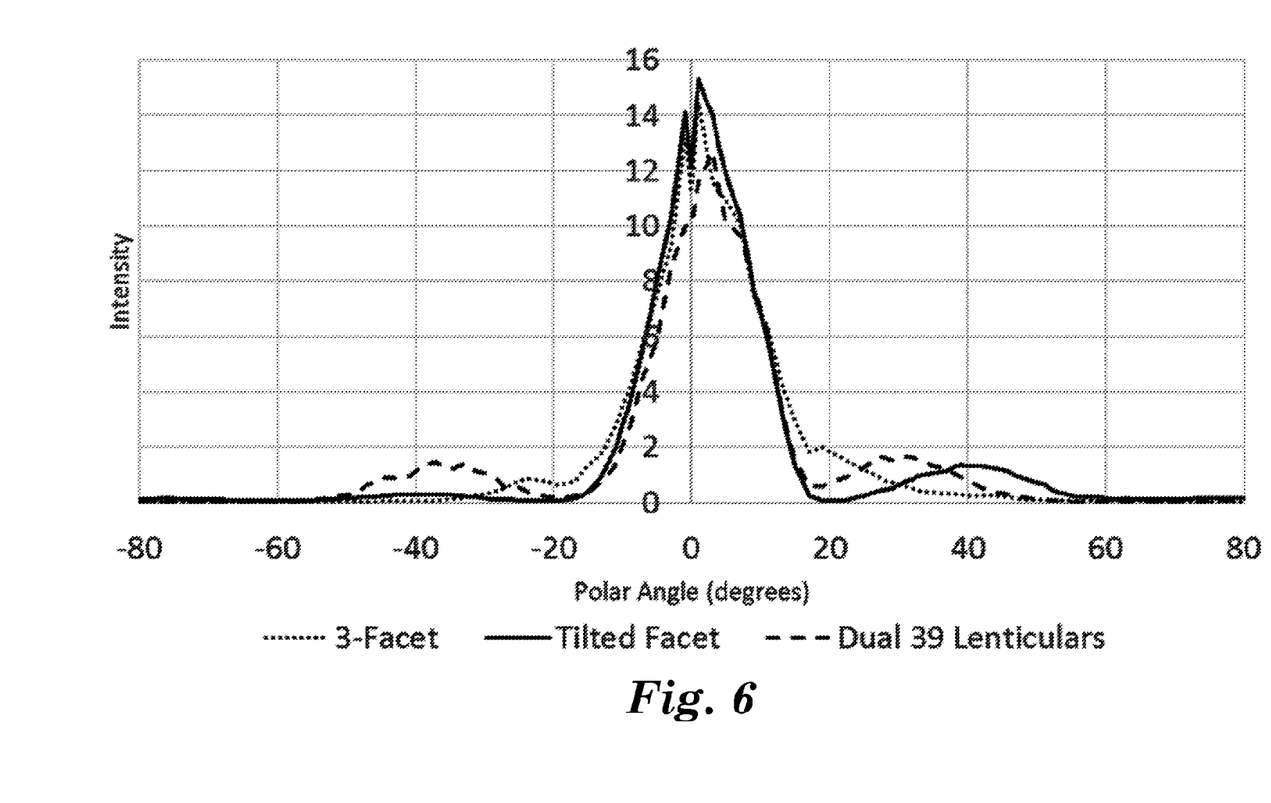
FIG. 6 is a plot of the down-guide luminance profile as a function of polar angle for each of three prism geometries in Example 1.

The model included a detector of the same length and width as the light guide that was positioned above the light guide stack with an air gap between the detector and the light guide stack. LightTools software was used to compute the luminance output of the light guide stack. The down-guide luminance profile is shown in FIG. 6 as a function of polar angle for each of the three prism geometries.

The modeling results indicate that there was significant off-axis luminance from recycled light near a polar angle of 30 degrees with the 39 degree isosceles prisms. For the three-facet and canted prism designs, the axial luminance increased by 12.4% and 20.6% respectively compared to the 39 degree isosceles prism design.

Example 2

A computer model of a light guide stack was prepared as follows using LightTools software (available from Synopsis, Pasadena Calif.). The top layer of the stack was modeled as an absorbing polarizer with 85% transmission and 15% reflection. Immediately below it was a layer modeled as a reflective polarizer with 50% reflection and 50% transmission having a transmission axis parallel to that of the absorbing polarizer. Next, in order, were a volume scattering layer with refractive index 1.47, another volume scattering layer with refractive index 1.18, a PET layer with refractive index 1.66, and another layer (simulating an adhesive) having index 1.417, no absorption and no scattering. Below that was a layer modeled as a light guide having refractive index of 1.587. Its dimensions were 96.5 mm cross-guide by 196.75 mm down-guide. The upper surface of the light guide had prisms of refractive index 1.586 running down-guide and the bottom surface had extractors running cross-guide. The upper surface prisms had a pitch of 17 micrometers, included angles of 156.8 degrees and equal base angles. The bottom extractors had a depth of 1.18 microns, an extraction facet of 3.25 degrees facing the light input edge and a back facet angle of 20 degrees. The extractor density increased down-guide. It was also assumed that a material with refractive index 1.405 with no scattering and no absorption filled the space between the PET layer and the light guide and thereby filled in the recesses of the structures on top of the light guide. A similar material was placed below the light guide's bottom extractors. The bottom layer of the light guide stack was a structured reflector with 95% surface reflectivity. Three such structured reflectors were modeled. The structured reflectors were modeled as prisms on a substrate having refractive index of 1.66 and no scattering or absorption, The prisms themselves had a refractive index of 1.565, no scattering or absorption, and surface reflectivity of 88%. The prisms were oriented cross-guide, perpendicular to the direction of light propagation from the light source, and having a pitch of 17 micrometers.

The light guide stack was modeled using two prism geometries for the structured reflectors. One (a narrow viewing angle design) had an included angle of 90 degrees, a base angle of 57.5 degrees facing the light source and base angle of 32.5 degrees on the other side. The side of the prisms facing away from the light source was a curved circular arc with a radius of 82 micrometers. The second geometry (a broad viewing angle design) also had an included angle of 90 degrees, but the base angle facing the light source was 56.5 degrees and the other base angle was 33.5 degrees. The side of the prisms facing away from the light source was also a curved circular arc, but with a radius of 51.25 micrometers.

The light input to the light guide was modeled as a set of 20 single LEDs simulating Nichia NSSW306F ray data sources. Light from the LEDs was concentrated into a narrower angular cone using a 90% reflective air concentrator. The model also included an angular detector centered above the light guide stack with a cross-guide width of 19.3 mm and a down-guide length of 39.35 mm.

Figure 7:
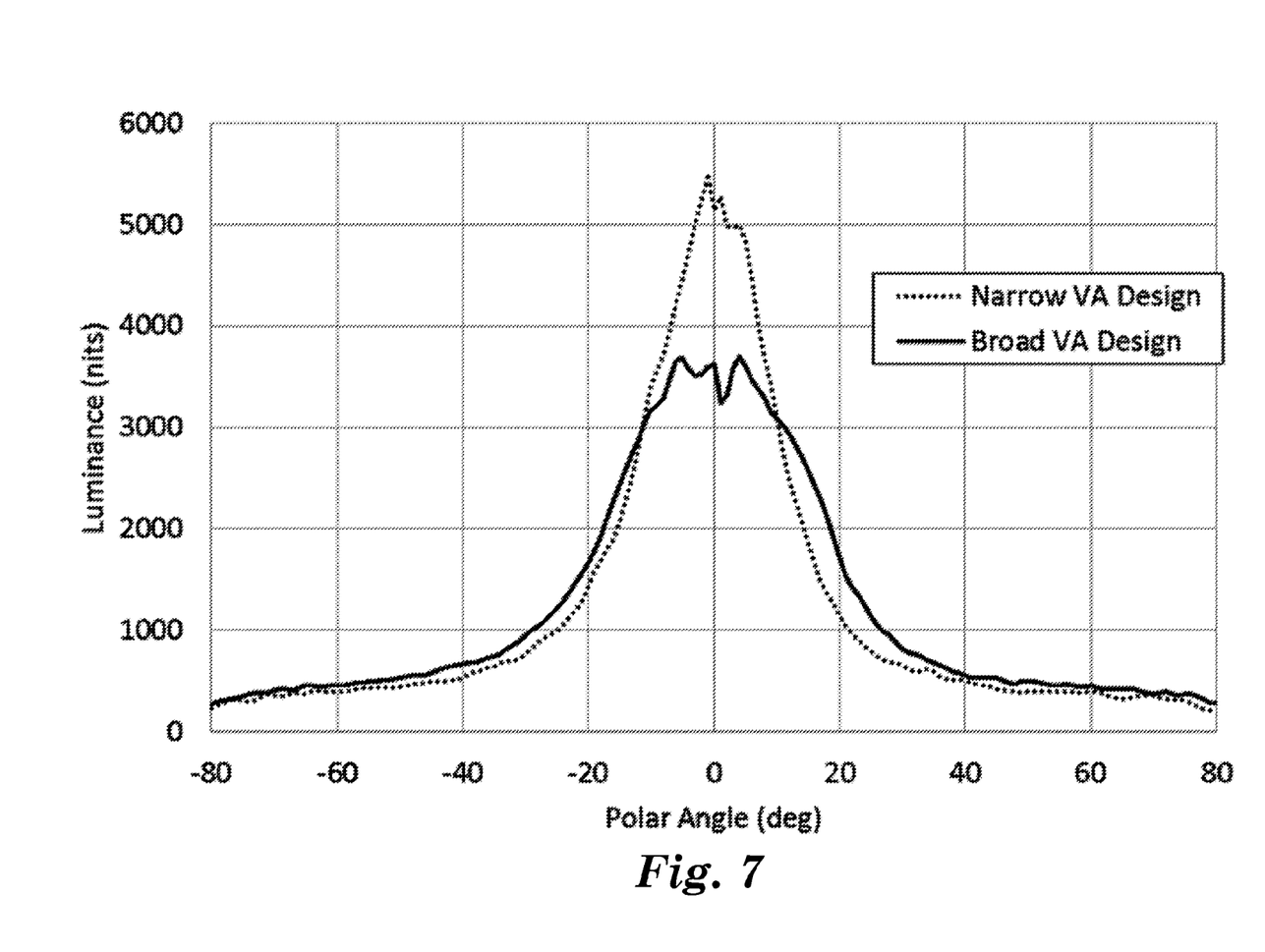
FIG. 7 is a plot of luminance as a function of polar angle for Example 2.

Luminance was computed for each of the two structured reflector configurations. Luminance as a function of polar angle is shown in FIG. 7. The results showed that the half brightness angle was 67% greater for the broad viewing angle design compared to the narrow viewing angle design (from 12 degrees to 20 degrees), while the axial luminance decreased by 29% (5128 cd/m$^2$ to 3630 cd/m$^2$) going from the narrow viewing angle design to the broad viewing angle design.

Example 3

Preparation of Light Guide Stack

A light guide stack for a recycling backlight system was assembled as follows. The bottom layer was a linear prismatic film with a pitch of 95 micrometers made from a UV-curable acrylate resin on a 120 micrometer thick PET substrate. The prism film thickness was 156 micrometers. The prisms were made using the well-known cast-and-cure process. The prisms had a vertex angle of 111 degrees and base angles of 41 and 28 degrees. Using a standard benchtop method the surface of the prisms was sputter coated with a 3 nm AZO (aluminum doped zinc oxide), then a 150 nm silver layer, and then a 75 nm AlSiOx layer. The coated film was then laminated to a 50 micrometer thick silicone pressure sensitive adhesive with refractive index 1.417, leaving a release liner on the open adhesive side. The laminate was then cut to a size of 110 mm by 176 mm with the prisms running in the 110 mm direction.

A light guide plate was compression injection molded using HL8502 polycarbonate (available from Mitsubishi Engineering Plastics America, Inc., Detroit Mich.). It was 550 micrometers thick, 179 mm long and 111 mm wide, with the light input edge along one of the 111 mm sides. The top side of the light guide had prisms facing outwards and running down-guide (along the short direction) with a pitch of 49.5 micrometers and an average included angle of 146 degrees and equal base angles of 17 degrees. The prism features extended continuously down-guide, starting at the input edge and terminating 1.7 mm from the distal edge, where the final 1.7 mm were planar. There was a planar featureless area 0.5 mm wide on the right side of the light guide and 0.1 mm wide on the left side of the light guide. The bottom side of the light guide plate had prisms as extraction features oriented cross-guide (along the long direction) and cut into the light guide with an average depth of 238 nanometers, a base angle of 3.5 degrees facing the light input side of the light guide and with the other base angle 20 degrees. The extraction features were continuous cross-guide and had a pitch that decreased down-guide. The extractor pitch at the input side of the light guide plate was 183.8 micrometers and on the distal side was 5.6 micrometers.

The sputter-coated prism film was then laminated to the bottom side of the light guide plate after removal of the release liner. The lamination was done so that the 51 degree facet of the prisms faced the light input edge of the light guide. The lamination left a 0.5 mm gap on the short edges of the light guide, a 2 mm gap on the input edge, and a 1 mm gap on the distal end. Next a cladding for the top side of the light guide was prepared by laminating a 2 mil (51 micrometer) thick biaxially oriented PET to a 50 micrometer thick silicone pressure sensitive adhesive having a refractive index of 1.417, leaving a release liner on the open adhesive side. The laminated films were then cut to dimensions of 110.0 mm by 176 mm, the release liner was removed, and the cladding was adhered to the upper layer of the light guide plate.

Preparation of Additional Film

A Sanritz HLC2-5618S absorbing polarizer (available from Sanritz America, Chula Vista Calif.) was laminated using its own adhesive to 3M APF-V3 reflective polarizer (available from 3M Company, St. Paul Minn.) with the transmission axis of the reflective polarizer aligned with the transmission axis of the absorbing polarizer. The laminated film was then cut to dimensions of 111 mm by 179 mm with the transmission axis along the short direction.

Testing

The light guide stack as described was illuminated from the light input side of the light guide using NSSW306F-HG LEDs (available from Nichia Corp., Tokushima, Japan) on a flexible printed circuit with a spacing of 4.75 mm and with the LEDs powered at 20 milliamps per LED. The laminated combination of absorbing polarizer and the APF-V3 reflective polarizer was then placed on top of the light guide stack with the APF-V3 side of the combination facing the light guide stack.

Figure 8:
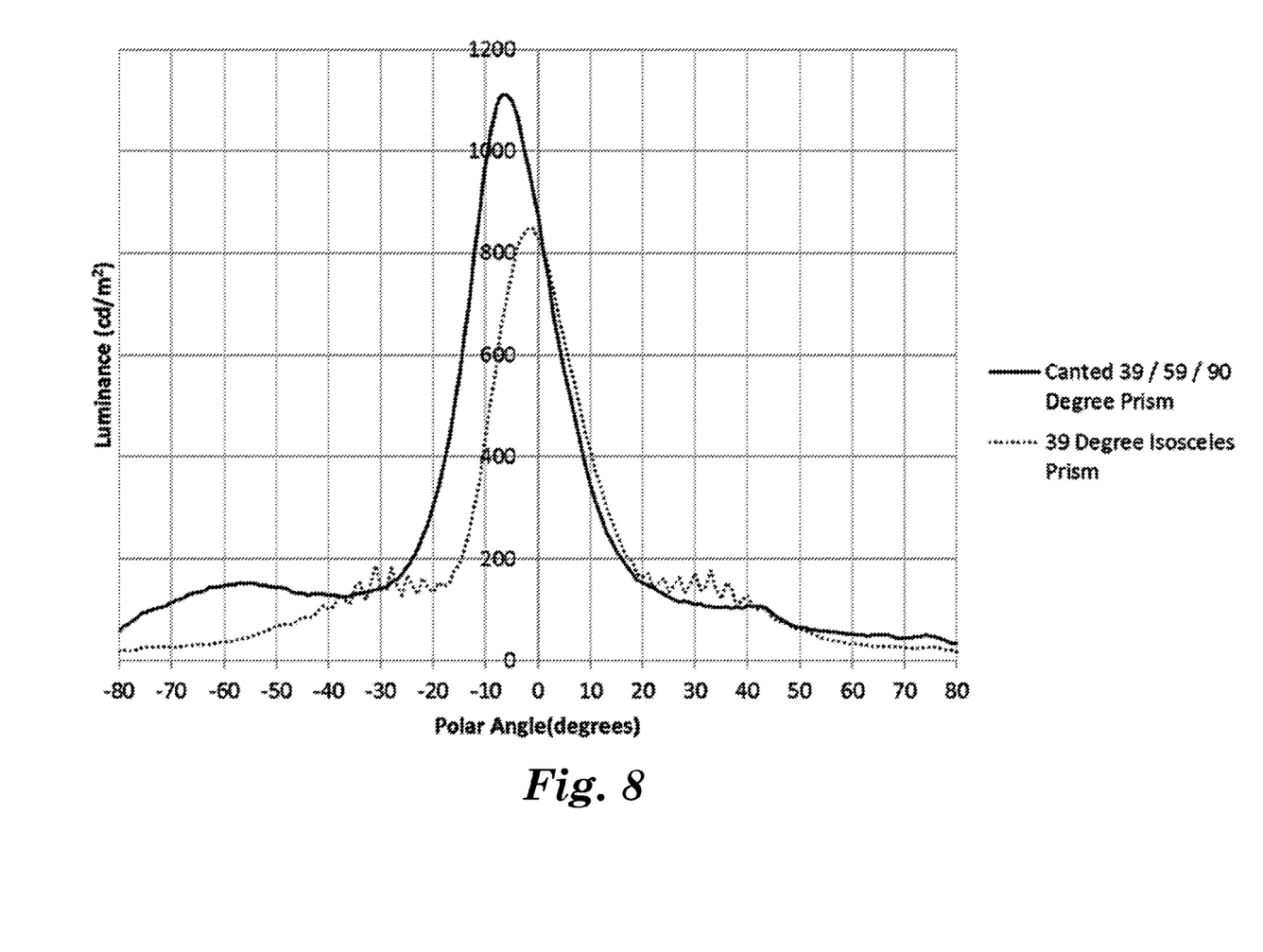
FIG. 8 is a plot of the down-guide luminance profile as a function of polar angle for Examples 3 and 4.

Using an Eldim L80 conoscope (available from Eldim, Hérouville Saint Clair, France) the luminance of the light guide stack was measured in the middle of the active area. Down-guide luminance is shown in FIG. 8 for down-guide luminance as a function of polar angle.

Example 4

A light guide stack was assembled as in Example 3 except that the structured reflective prisms of the bottom prism film had an included angle of 90 degrees, a base angle of 39 degrees facing the direction of the light source and a base angle of 51 degrees facing the distal side. Luminance was measured as before and is also shown in FIG. 8. It was noted that the maximum luminance in Example 4 is 30.5% higher than that of Example 3, while the axial luminance is 5.3% higher. While the maximum luminance was about 8 degrees off-axis for Example 4, it was noted that this offset could be corrected by adjustment of the bottom prism geometry.

The following are exemplary embodiment according to the present disclosure:

Item 1. A recycling backlight system, comprising:
- a reflective polarizer;
- a structured reflector;
- a lightguide having an input surface, the lightguide disposed between the reflective polarizer and the structured reflector;
- wherein the lightguide has a first range of emission angles $\theta$ for light coupled into the input surface and extracted from the lightguide, the range of emission angles $\theta$ measured with respect to a normal axis of the reflective polarizer;
- wherein the structured reflector is configured to retroreflect light at a second range of angles $\phi$ measured with respect to the normal axis of the reflective polarizer;
- wherein the structured reflector is configured to redirect light from a third range of angles $\psi$, measured with respect to the normal axis of the reflective polarizer, to within 30 degrees of the normal axis of the reflective polarizer; and
- wherein no angles of $\theta$ are also angles $\phi$.

Item 2. The recycling backlight system of item 1, wherein all angles of $\theta$ are also angles of $\psi$.

Item 3. The recycling backlight system of item 1, wherein the structured reflector is a metallized structured reflector.

Item 4. The recycling backlight system of item 1, wherein the structured reflector is an interface between a transmissive material and air.

Item 5. The recycling backlight system of item 1, wherein the structured reflector is bonded to the lightguide without an air gap.

Item 6. The recycling backlight system of item 1, wherein the structured reflector is free floating.

Item 7. The recycling backlight system of item 1, wherein the reflective polarizer is bonded to the lightguide without an air gap.

Item 8. The recycling backlight of item 7, wherein the reflective polarizer is bonded to the lightguide by a low index adhesive.

Item 9. The recycling backlight of item 8, wherein the low index adhesive has a refractive index and the lightguide has a refractive index, and the refractive index of the low index adhesive is at least 0.1 less than the refractive index of the lightguide.

Item 10. The recycling backlight system of item 1, wherein the structured reflector includes a plurality of microstructures, each of the plurality of microstructures including a right angle retroreflecting portion and a canted redirecting portion disposed next to at least one right angle retroreflecting portion.

Item 11. The recycling backlight system of item 10, wherein the canted redirecting portion is flat.

Item 12. The recycling backlight system of item 10, wherein the canted redirecting portion is curved.

Item 13. The recycling backlight system of item 12, wherein the canted redirecting portion curves away from the normal axis of the reflective polarizer.

Item 14. The recycling backlight system of item 10, wherein the right angle retroreflecting portion has unequal facet lengths.

Item 15. The recycling backlight system of item 14, wherein a line connecting the two base edges of the right angle reflecting portion forms an angle with the normal axis of the reflective polarizer that is less than any angle of $\theta$.

Item 16. The recycling backlight system of item 15, wherein right angle retroreflecting portions form more than 50 percent of the projected area of the structured reflector.

Item 17. The recycling backlight system of item 10, wherein the right angle retroreflecting portion is tilted with respect to the normal axis of the reflective polarizer such that the intersection of the right angle of the right angle retroreflecting portion by the normal axis of the reflective polarizer results in two angles of unequal value.

Item 18. The recycling backlight system of item 1, wherein the structured reflector includes a plurality of reflective microcavities, each of the plurality of reflective microcavities including a right angle retroreflecting portion and a canted redirecting portion disposed next to at least one right angle retroreflecting portion.

Item 19. The recycling backlight system of item 18, wherein the right angle retroreflecting portion has unequal facet lengths.

Item 20. The recycling backlight system of item 19, wherein a line connecting the two base edges of the right angle reflecting portion forms an angle with the normal axis of the reflective polarizer that is less than any angle of θ.

Item 21. The recycling backlight system of item 20, wherein right angle retroreflecting portions form more than 50 percent of the projected area of the structured reflector.

Item 22. A recycling backlight system, comprising:
- a reflective polarizer;
- a structured reflector;
- a lightguide having an input surface, the lightguide disposed between the reflective polarizer and the structured reflector;
- wherein the lightguide has a first range of emission angles θ for light coupled into the input surface and extracted from the lightguide, the range of emission angles θ measured with respect to a normal axis of the reflective polarizer;
- wherein the structured reflector is configured to reflect but not redirect light at a second range of angles φ measured with respect to the normal axis of the reflective polarizer;
- wherein the structured reflector is configured to redirect light from a third range of angles ψ, measured with respect to the normal axis of the reflective polarizer, to within 30 degrees of the normal axis of the reflective polarizer; and
- wherein no angles of θ are also angles φ.

Item 23. The recycling backlight system of item 22, wherein all angles of θ are also angles of ψ.

Item 24. The recycling backlight system of item 22, wherein the structured reflector is a metallized structured reflector.

Item 25. The recycling backlight system of item 22, wherein the structured reflector is an interface between a transmissive material and air.

What is claimed is:

1. A recycling backlight system, comprising:
   - a reflective polarizer;
   - a structured reflector;
   - a lightguide having an input surface, the lightguide disposed between the reflective polarizer and the structured reflector;
   - wherein the lightguide has a first range of emission angles θ for light coupled into the input surface and extracted from the lightguide, the range of emission angles θ measured with respect to a normal axis of the reflective polarizer;
   - wherein the structured reflector is configured to retroreflect light at a second range of angles φ measured with respect to the normal axis of the reflective polarizer;
   - wherein the structured reflector is configured to redirect light from a third range of angles ψ, measured with respect to the normal axis of the reflective polarizer, to within 30 degrees of the normal axis of the reflective polarizer; and
   - wherein no angles of θ are also angles φ.

2. The recycling backlight system of claim 1, wherein all angles of θ are also angles of ψ.

3. The recycling backlight system of claim 1, wherein the structured reflector is a metallized structured reflector.

4. The recycling backlight system of claim 1, wherein the structured reflector is an interface between a transmissive material and air.

5. The recycling backlight system of claim 1, wherein the structured reflector is bonded to the lightguide without an air gap.

6. The recycling backlight system of claim 1, wherein the structured reflector is free floating.

7. The recycling backlight system of claim 1, wherein the reflective polarizer is bonded to the lightguide without an air gap.

8. The recycling backlight of claim 7, wherein the reflective polarizer is bonded to the lightguide by a low index adhesive.

9. The recycling backlight of claim 8, wherein the low index adhesive has a refractive index and the lightguide has a refractive index, and the refractive index of the low index adhesive is at least 0.1 less than the refractive index of the lightguide.

10. The recycling backlight system of claim 1, wherein the structured reflector includes a plurality of microstructures, each of the plurality of microstructures including a right angle retroreflecting portion and a canted redirecting portion disposed next to at least one right angle retroreflecting portion.

11. The recycling backlight system of claim 10, wherein the canted redirecting portion is flat.

12. The recycling backlight system of claim 10, wherein the canted redirecting portion is curved.

13. The recycling backlight system of claim 12, wherein the canted redirecting portion curves away from the normal axis of the reflective polarizer.

14. The recycling backlight system of claim 10, wherein the right angle retroreflecting portion has unequal facet lengths.

15. The recycling backlight system of claim 14, wherein a line connecting the two base edges of the right angle reflecting portion forms an angle with the normal axis of the reflective polarizer that is less than any angle of θ.

16. The recycling backlight system of claim 15, wherein right angle retroreflecting portions form more than 50 percent of the projected area of the structured reflector.

17. The recycling backlight system of claim 10, wherein the right angle retroreflecting portion is tilted with respect to the normal axis of the reflective polarizer such that the intersection of the right angle of the right angle retroreflecting portion by the normal axis of the reflective polarizer results in two angles of unequal value.

18. The recycling backlight system of claim 1, wherein the structured reflector includes a plurality of reflective microcavities, each of the plurality of reflective microcavities including a right angle retroreflecting portion and a canted redirecting portion disposed next to at least one right angle retroreflecting portion.

19. The recycling backlight system of claim 18, wherein the right angle retroreflecting portion has unequal facet lengths.

20. The recycling backlight system of claim 19, wherein a line connecting the two base edges of the right angle reflecting portion forms an angle with the normal axis of the reflective polarizer that is less than any angle of θ.

21. The recycling backlight system of claim 20, wherein right angle retroreflecting portions form more than 50 percent of the projected area of the structured reflector.

22. A recycling backlight system, comprising:
   - a reflective polarizer;
   - a structured reflector;

a lightguide having an input surface, the lightguide disposed between the reflective polarizer and the structured reflector;

wherein the lightguide has a first range of emission angles $\theta$ for light coupled into the input surface and extracted from the lightguide, the range of emission angles $\theta$ measured with respect to a normal axis of the reflective polarizer;

wherein the structured reflector is configured to reflect but not redirect light at a second range of angles $\phi$ measured with respect to the normal axis of the reflective polarizer;

wherein the structured reflector is configured to redirect light from a third range of angles $\psi$, measured with respect to the normal axis of the reflective polarizer, to within 30 degrees of the normal axis of the reflective polarizer; and wherein no angles of $\theta$ are also angles $\phi$.

23. The recycling backlight system of claim 22, wherein all angles of $\theta$ are also angles of $\psi$.

24. The recycling backlight system of claim 22, wherein the structured reflector is a metallized structured reflector.

25. The recycling backlight system of claim 22, wherein the structured reflector is an interface between a transmissive material and air.

* * * * *